US012672118B2

(12) United States Patent
Xing

(10) Patent No.: US 12,672,118 B2
(45) Date of Patent: Jun. 30, 2026

(54) METHOD FOR CONFIGURING MULTIPLE CARRIERS, TERMINAL DEVICE, AND NETWORK DEVICE

(71) Applicant: GUANGDONG OPPO MOBILE TELECOMMUNICATIONS CORP., LTD., Dongguan (CN)

(72) Inventor: Jinqiang Xing, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 526 days.

(21) Appl. No.: 17/958,576

(22) Filed: Oct. 3, 2022

(65) Prior Publication Data

US 2023/0021791 A1      Jan. 26, 2023

Related U.S. Application Data

(63) Continuation of application No. PCT/CN2020/083606, filed on Apr. 7, 2020.

(51) Int. Cl.
*H04W 72/0453*      (2023.01)
*H04W 8/24*      (2009.01)

(52) U.S. Cl.
CPC ......... *H04W 72/0453* (2013.01); *H04W 8/24* (2013.01)

(58) Field of Classification Search
None
See application file for complete search history.

(56) References Cited

U.S. PATENT DOCUMENTS

| | | | | |
|---|---|---|---|---|
| 11,470,581 B2 * | 10/2022 | Tsai | | H04L 5/001 |
| 2012/0157143 A1 * | 6/2012 | Tsunekawa | | H04L 5/0058 |
| | | | | 455/509 |
| 2012/0320769 A1 * | 12/2012 | Callender | | H04L 27/2647 |
| | | | | 370/252 |
| 2013/0114579 A1 * | 5/2013 | Vujcic | | H04W 24/02 |
| | | | | 370/336 |

(Continued)

FOREIGN PATENT DOCUMENTS

| | | | |
|---|---|---|---|
| CN | 102571664 A * | 7/2012 | |
| WO | 2013147680 A2 | 10/2013 | |

(Continued)

OTHER PUBLICATIONS

Extended European Search Report in the European application No. 20930597.8, mailed on Apr. 17, 2023. 12 pages.

(Continued)

*Primary Examiner* — Khaled M Kassim
*Assistant Examiner* — Shima Wasel
(74) *Attorney, Agent, or Firm* — BAYES PLLC

(57) ABSTRACT

Provided are a method for configuring multiple carriers, a terminal device, and a network device. The method includes that: a terminal device sends first information and/or second information to a network device, the first information being configured to indicate a radio frequency architecture capability of the terminal device, and the second information being configured to indicate a radio frequency link capability of the terminal device. By the embodiments of the disclosure, a network device may configure multiple carriers for a terminal device based on information reported by the terminal device.

14 Claims, 8 Drawing Sheets

Unilateral carrier addition

Bilaterally asymmetric carrier addition

Non-bilaterally-symmetric carrier addition

(56) References Cited

U.S. PATENT DOCUMENTS

| | | | | |
|---|---|---|---|---|
| 2014/0092825 A1* | 4/2014 | Bostrom | | H04L 5/0044 |
| | | | | 370/329 |
| 2014/0301339 A1* | 10/2014 | Sesia | | H04W 52/0238 |
| | | | | 370/329 |
| 2015/0023268 A1* | 1/2015 | Uchino | | H04B 7/0613 |
| | | | | 370/329 |
| 2016/0081105 A1* | 3/2016 | Mizusawa | | H04J 11/005 |
| | | | | 370/329 |
| 2018/0007707 A1* | 1/2018 | Rico Alvarino | | H04L 12/28 |
| 2019/0097608 A1* | 3/2019 | Gathman | | H03H 11/08 |
| 2020/0021409 A1 | 1/2020 | Kumar et al. | | |
| 2021/0058767 A1 | 2/2021 | Wiemann et al. | | |
| 2021/0289348 A1 | 9/2021 | Wiemann et al. | | |
| 2021/0377933 A1* | 12/2021 | Takahashi | | H04W 28/20 |
| 2022/0173845 A1* | 6/2022 | Zhang | | H04W 72/21 |

FOREIGN PATENT DOCUMENTS

| | | | | |
|---|---|---|---|---|
| WO | 2019231384 A1 | 12/2019 | | |
| WO | WO-2020015664 A1 * | 1/2020 | | H04W 52/0225 |

OTHER PUBLICATIONS

St-Ericsson et al. "Non-contiguous carrier aggregation configurations" 3GPP TSG RAN WG4 Meeting #59AH R4-113595, Jul. 1, 2011 (Jul. 1, 2011).

Samsung. "HD-FDD for New Category UEs" 3GPP TSG RAN WG1 #77 R1-142090, May 23, 2014 (May 23, 2014).

Nokia Corporation et al. "Multiple TA UE capabilities in Release 11." 3GPP TSG-RAN WG2 Meeting #80 R2-125568, Nov. 16, 2012 (Nov. 16, 2012).

Ericsson et al. "Correction to 4C-HSDPA to support signaling for non-adjacent aggregation" 3GPP TSG-RAN WG2 #74 R2-113687, May 13, 2011 (May 13, 2011).

International Search Report in the international application No. PCT/CN2020/083606, mailed on Dec. 30, 2020.

English translation of the Written Opinion of the International Searching Authority in the international application No. PCT/CN2020/083606, mailed on Dec. 30, 2020.

* cited by examiner

1000

Transmitting link Receiving link

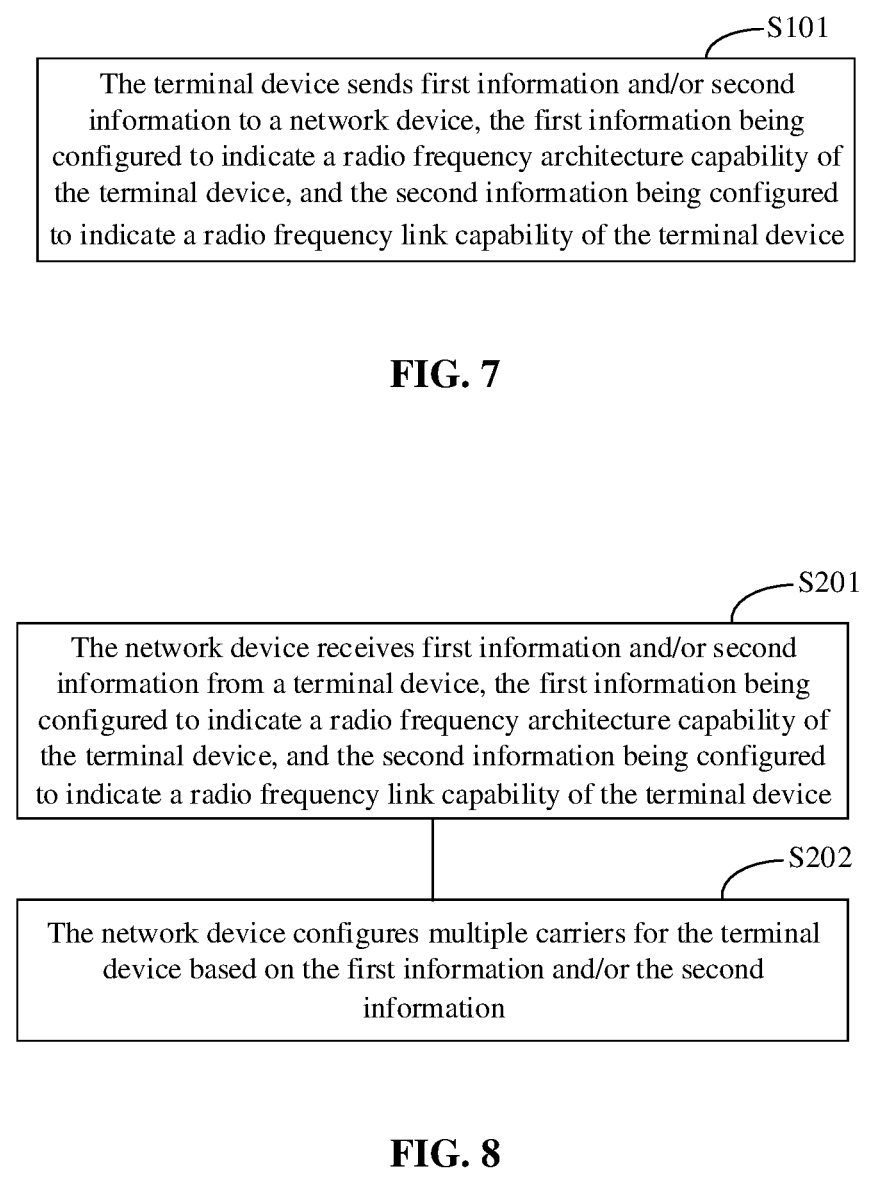

S101

The terminal device sends first information and/or second information to a network device, the first information being configured to indicate a radio frequency architecture capability of the terminal device, and the second information being configured to indicate a radio frequency link capability of the terminal device

The network device receives first information and/or second information from a terminal device, the first information being configured to indicate a radio frequency architecture capability of the terminal device, and the second information being configured to indicate a radio frequency link capability of the terminal device

S202

The network device configures multiple carriers for the terminal device based on the first information and/or the second information

FIG. 8

Bilaterally symmetric carrier addition

Unilateral carrier addition          Bilaterally asymmetric carrier addition

Non-bilaterally-symmetric
carrier addition

200

METHOD FOR CONFIGURING MULTIPLE CARRIERS, TERMINAL DEVICE, AND NETWORK DEVICE

CROSS-REFERENCE TO RELATED APPLICATION

This application is a continuation of International Application No. PCT/CN2020/083606, filed on Apr. 7, 2020, the disclosure of which is incorporated herein by reference in its entirety.

TECHNICAL FIELD

The disclosure relates to the field of communication, and more particularly to a method for configuring multiple carriers, a terminal device, and a network device.

BACKGROUND

Multi-carrier communication technology has been applied extensively to existing communication systems. For example, both carrier aggregation (CA) and dual connectivity (DC) belong to multi-carrier communication technology. Generally speaking, after a terminal device accesses a single-carrier cell, a network device, such as a base station (ST), may configure other uplink (UL) or downlink (DL) carriers for the terminal device, thereby forming multi-carrier communication. In 4th-generation mobile communication technology, a maximum bandwidth of a single carrier is relatively small, e.g., 20 MHz, while a capability of a radio frequency device or radio frequency transceiver of a terminal device may generally reach hundreds of megahertz, so a base station can configure positions and amount of carriers easily.

However, in a 5th-generation (5G) new radio (NR) system, a bandwidth of a single carrier is relatively large. For example, in a millimeter wave system, a bandwidth of a single carrier may generally reach 400 MHz. If continuous multi-carrier configuration is adopted, a bandwidth after multi-carrier aggregation may be more than 800 MHz. If in-band discontinuous multi-carrier configuration is adopted, a bandwidth after multi-carrier aggregation may be more than 1 GHz. When a bandwidth increases sharply, a range supported by a terminal device may be exceeded easily if a base station configures multiple carriers for the terminal device according to the current method. Therefore, a research is needed for how a base station configures multiple carriers for a terminal device in an NR system.

SUMMARY

In view of this, embodiments of the disclosure provide a method for configuring multiple carriers, a terminal device, and a network device, which may be implemented to configure multiple carriers for the terminal device.

The embodiments of the disclosure provide a method for configuring multiple carriers, which may be implemented by a terminal device and include the following operation.

The terminal device sends first information and/or second information to a network device, the first information being configured to indicate a radio frequency architecture capability of the terminal device, and the second information being configured to indicate a radio frequency link capability of the terminal device.

The embodiments of the disclosure provide a method for configuring multiple carriers, which may be implemented by a network device and include the following operations.

The network device receives first information and/or second information from a terminal device, the first information being configured to indicate a radio frequency architecture capability of the terminal device, and the second information being configured to indicate a radio frequency link capability of the terminal device. The network device configures multiple carriers for the terminal device based on the first information and/or the second information.

The embodiments of the disclosure also provide a terminal device, which may include a sending module.

The sending module may be configured to send first information and/or second information to a network device, the first information being configured to indicate a radio frequency architecture capability of the terminal device, and the second information being configured to indicate a radio frequency link capability of the terminal device.

The embodiments of the disclosure also provide a network device, which may include a receiving module and a configuration module.

The receiving module may be configured to receive first information and/or second information from a terminal device, the first information being configured to indicate a radio frequency architecture capability of the terminal device, and the second information being configured to indicate a radio frequency link capability of the terminal device. The configuration module may be configured to configure multiple carriers for the terminal device based on the first information and/or the second information.

The embodiments of the disclosure also provide a terminal device, which may include a processor and a memory. The memory may be configured to store a computer program. The processor may call and run the computer program stored in the memory to implement the method for configuring multiple carriers as described above.

The embodiments of the disclosure also provide a network device, which may include a processor and a memory. The memory may be configured to store a computer program. The processor may call and run the computer program stored in the memory to implement the method for configuring multiple carriers as described above.

The embodiments of the disclosure also provide a chip, which may include a processor, configured to call from a memory and run a computer program to enable a device installed with the chip to implement the method for configuring multiple carriers as described above.

The embodiments of the disclosure also provide a computer-readable storage medium, which may be configured to store a computer program. The computer program may enable a computer to execute the method for configuring multiple carriers as described above.

The embodiments of the disclosure also provide a computer program product, which may include a computer program instruction. The computer program instruction may enable a computer to execute the method for configuring multiple carriers as described above.

The embodiments of the disclosure also provide a computer program, which may enable a computer to execute the method for configuring multiple carriers as described above.

Based on the technical solutions in the embodiments of the disclosure, a terminal device may report a radio frequency architecture capability and/or radio frequency link capability of the terminal device to a network device, and then the network device may configure multiple suitable carriers for the terminal device based on the multi-carrier capability supported by the terminal device, thereby avoiding an implementation capability of the terminal device from being exceeded during multi-carrier configuration.

BRIEF DESCRIPTION OF THE DRAWINGS

FIG. 1 is a schematic diagram of a communication system architecture that the embodiments of the disclosure are applied to.

FIG. 7 is a flow block diagram of a method for configuring multiple carriers for a terminal device according to an embodiment of the disclosure.

FIG. 8 is a flow block diagram of a method for configuring multiple carriers for a network device according to an embodiment of the disclosure.

DETAILED DESCRIPTION

Figure 1:
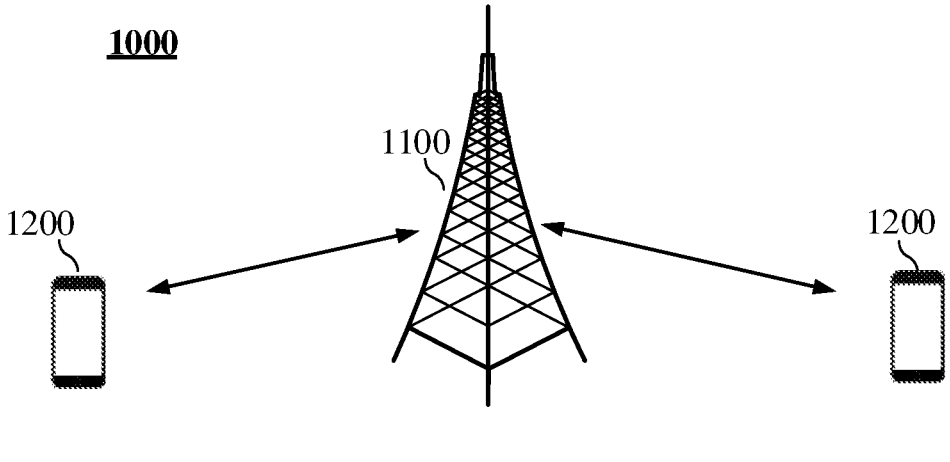

The technical solutions in the embodiments of the disclosure will be described below in combination with the drawings in the embodiments of the disclosure.

The technical solutions in the embodiments of the disclosure may be applied to various communication systems, such as a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an Advanced LTE (LTE-A) system, an NR system, an evolved system of the NR system, an LTE-based access to unlicensed spectrum (LTE-U) system, an NR-based access to unlicensed system (NR-U) system, a Non-Terrestrial Network (NTN) system, a Universal Mobile Telecommunication System (UMTS), Wireless Local Area Networks (WLAN), Wireless Fidelity (WiFi), a 5G system, or another communication system.

Generally speaking, connections supported by a conventional communication system are limited in number and easy to be implemented. However, with the development of communication technologies, a mobile communication system will not only support conventional communication but also support, for example, Device to Device (D2D) communication, Machine to Machine (M2M) communication, Machine Type Communication (MTC), Vehicle to Vehicle (V2V) communication, or Vehicle to everything (V2X) communication. The embodiments of the disclosure may also be applied to these communication systems.

Optionally, the communication system in the embodiments of the disclosure may be applied to a carrier aggregation (CA) scenario, or a dual connectivity (DC) scenario, or a Standalone (SA) network deployment scenario.

Each of the embodiments of the disclosure is described in combination with a network device and a terminal device. The terminal device may also be referred to as User Equipment (UE), an access terminal, a user unit, a user ST, a mobile ST, a mobile ratio ST, a remote ST, a remote terminal, a mobile device, a user terminal, a terminal, a wireless communication device, a user agent, a user device, or the like.

The terminal device may be a station (ST) in the WLAN, or may be a cell phone, a cordless phone, a session initialization protocol (SIP) phone, a wireless local loop (WLL) station, a personal digital assistant (PDA), a handheld device with a wireless communication function, a computing device, another processing device connected to a wireless modem, a vehicle-mounted device, a wearable device, a terminal device in a next-generation communication system such as an NR network, a terminal device in a further evolved public land mobile network (PLMN), or the like.

In the embodiments of the disclosure, the terminal device may be deployed on land indoors or outdoors in a handheld, wearable, or vehicle-mounted form, or may be deployed above water (for example, in a ship), or may be deployed in the air (for example, on an airplane, a balloon, and a satellite).

In the embodiments of the disclosure, the terminal device may be a mobile phone, a pad, a computer with a wireless transceiver function, a virtual reality (VR) terminal device, an augmented reality (AR) terminal device, a wireless terminal device for industrial control, a wireless terminal device for self driving, a wireless terminal device for remote medical surgery, a wireless terminal device for smart grid, a wireless terminal device for transportation safety, a wireless terminal device for smart city, a wireless terminal device for smart home, or the like.

As an example rather than restriction, in the embodiments of the disclosure, the terminal device may also be a wearable device. The wearable device, also referred to as a wearable intelligent device, is a generic term of wearable devices obtained by performing intelligentization designing and development on daily wearing products, such as glasses, gloves, watches, clothes, and shoes. The wearable device is a portable device directly worn or integrated to clothes or accessory of a user. The wearable device not only is a hardware device but also realizes powerful functions by software support, data interaction, and cloud interaction. Generalized wearable intelligent devices include, for example, intelligent watches or intelligent glasses with complete functions and large sizes and capable of realizing all or part of functions independent of intelligent phones, and for example, various types of sign monitoring intelligent bands and intelligent jewelries of which each is dedicated to application functions of a certain type and required to be matched with other devices such as intelligent phones for use.

In the embodiments of the disclosure, the network device may be a device for communication with a mobile device. The network device may be an access point (AP) in the WLAN, or a base transceiver station (BTS) in the GSM or CDMA, or a nodeB (NB) in WCDMA, or an evolutional node B (eNB or eNodeB) in LTE, or a relay station or AP, or a vehicle-mounted device, a wearable device, a network device (gNB) in the NR network, a network device in the future evolved PLMN, or the like.

As an example rather than restriction, in the embodiments of the disclosure, the network device is mobile. For example, the network device may be a mobile device. Optionally, the network device may be a satellite and a balloon ST. For example, the satellite may be a low earth orbit (LEO) satellite, a medium earth orbit (MEO) satellite, a geostationary earth orbit (GEO) satellite, and a high elliptical orbit (HEO) satellite. Optionally, the network device may also be a base station arranged on land, in water, and at other positions.

In the embodiments of the disclosure, the network device may provide service for a cell, and the terminal device communicates with the network device through a transmission resource (such as a frequency-domain resource or a spectrum resource) for the cell. The cell may be a cell corresponding to the network device (such as a base station), and the cell may belong to a macro base station or a base station corresponding to a small cell. Here, the small cell may include: a metro cell, a micro cell, a pico cell, a femto cell, etc. These small cells have the characteristics of small coverage and low transmitted power, and are suitable for providing high-rate data transmission service.

FIG. 1 schematically shows one network device 1100 and two terminal devices. Optionally, the wireless communication system 1000 may include multiple network devices 1100, and another number of terminal devices may be included in coverage of each network device 1100. No limits are made thereto in the embodiments of the disclosure. Optionally, the wireless communication system 1000 shown in FIG. 1 may further include another network entity, such as a mobility management entity (MME) and an access and mobility management function (AMF) entity. No limits are made thereto in the embodiments of the disclosure.

It is to be understood that terms "system" and "network" herein are usually interchangeable herein. Term "and/or" herein is for describing an association relationship between associated objects, and for example, represents that there may be three relationships between previous and next associated objects. For example, A and/or B may represent three conditions: existence of only A, existence of both A and B, and existence of only B. Character "/" herein usually represents that previous and next associated objects are in an "or" relationship.

In order to describe the idea of the embodiments of the disclosure clearly, multi-carrier configuration is described first briefly.

In this technical field, configuration of multiple carriers by a network device for a terminal device is related to a radio frequency transceiver architecture of the terminal device. The radio frequency transceiver architecture of the terminal device includes a local oscillator (LO). The LO is configured to provide reference frequencies for transmission and reception of the terminal device so as to modulate a baseband (BB) signal into a corresponding radio frequency signal. The LO may be implemented by various modes, such as a phase locked loop (PLL), and usually includes a reference fixed-frequency source, a phase detector, a low-pass filter, a voltage controlled oscillator (VCO), and a frequency divider.

Figure 2:
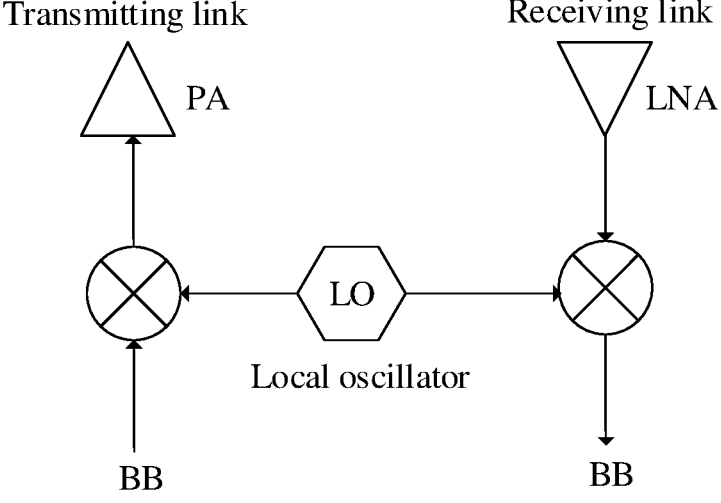
FIG. 2 is a schematic diagram of a transmitting link and receiving link shared local oscillator (LO) architecture of a terminal device.
Figure 3:
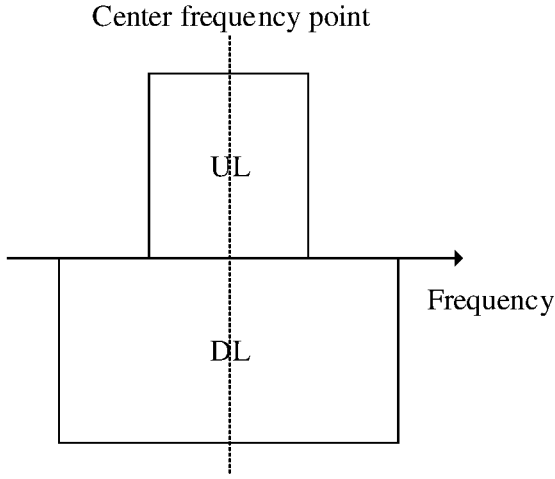
FIG. 3 is a schematic diagram of configuring, by a network device, UL and DL carriers for the terminal device in an embodiment of FIG. 2.

FIG. 2 is a schematic diagram of a transmitting link and receiving link shared LO architecture. In this architecture, the same LO is applied to a transmitting link and a receiving link. The transmitting link and receiving link shared LO architecture needs to work under the condition that the center frequency point of a UL carrier and the center frequency point of a DL carrier are the same. As shown in FIG. 3, the network device is severely restricted when configuring positions of UL and DL carriers.

Figure 4:
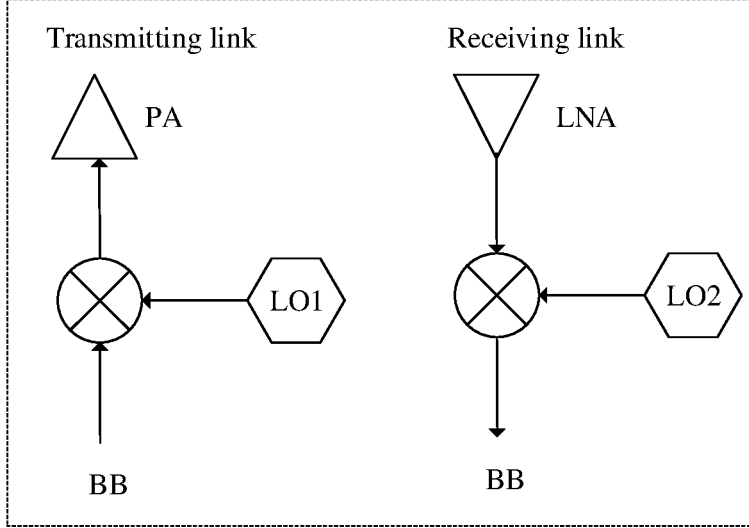
FIG. 4 is a schematic diagram of a transmitting link and receiving link separated LO architecture of a terminal device.
Figure 5:
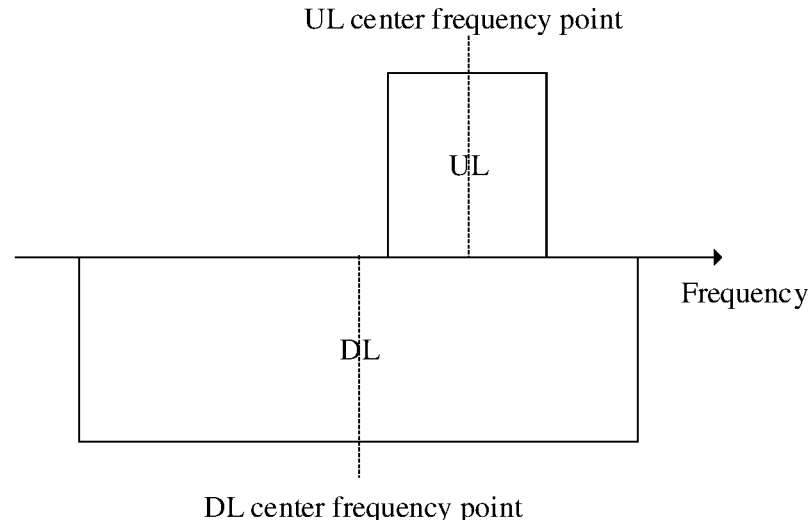
FIG. 5 is a schematic diagram of configuring, by a network device, UL and DL carriers for the terminal device in an embodiment of FIG. 4.

FIG. 4 is a schematic diagram of a transmitting link and receiving link separated LO architecture. In this architecture, multiple independent LOs are applied to a transmitting link and a receiving link respectively. The transmitting link and receiving link separated LO architecture may work under the condition that the center frequency point of a UL carrier and the center frequency point of a DL carrier are the same or different. As shown in FIG. 5, the network device is restricted less when configuring positions of UL and DL carriers.

Figure 6:
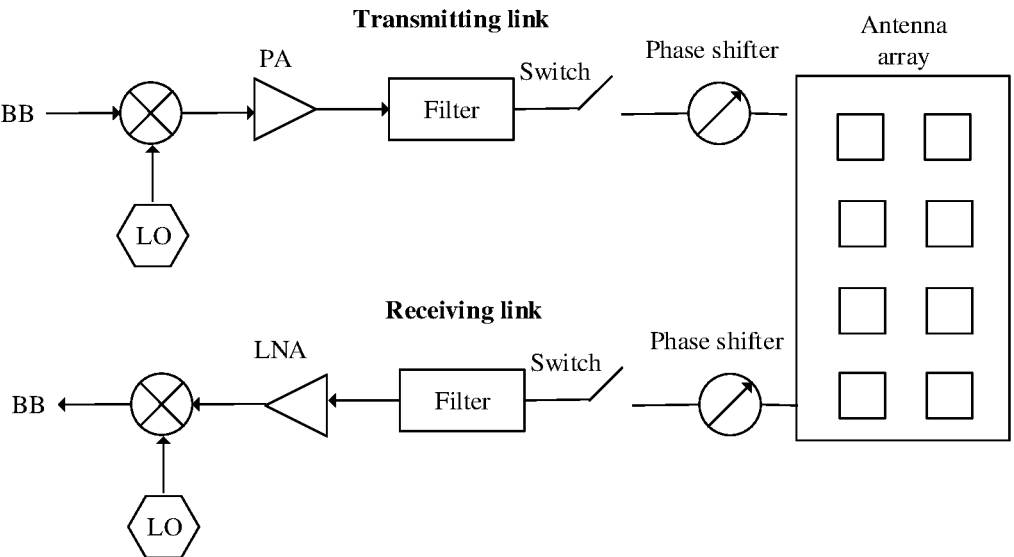
FIG. 6 is a structure diagram of a transmitting link and receiving link of a terminal device.

On another hand, configuration of multiple carriers by the network device for the terminal device is also related to a radio frequency link capability of the terminal device. The radio frequency link capability of the terminal device is related to a bandwidth supported by a radio frequency device on a radio frequency link of the terminal device. Taking millimeter wave as an example, FIG. 6 shows radio frequency links of a terminal device, including a transmitting link and a receiving link. The radio frequency link of the terminal device may include a power amplifier (PA), a filter, a switch, a phase shifter, a low noise amplifier (LNA), and other radio frequency devices. A bandwidth range supported by each device is limited, so a bandwidth capability supported by the terminal device is also limited. Bandwidths supported by radio frequency devices are not completely the same. For example, a working bandwidth supported by a switch is relatively large, and bandwidths supported by a PA and a filter are relatively small. In addition, capabilities of the terminal device on the transmitting link and the receiving link are also different.

Therefore, configuration of multiple carriers by the network device for the terminal device needs to be adapted to the capability of the terminal device the transmitting link and the capability of the terminal device on the receiving link.

Based on in-depth studies, it is found that, if a network device directly performs multi-carrier configuration for a terminal device without knowing about related information of the terminal device, the terminal device is likely not to support the configuration. For example, the terminal device is provided with a transmitting link and receiving link shared LO architecture, but is configured with multiple UL and DL carriers whose center frequency points are different, and in such case, the terminal device is unable to support the configuration.

To this end, the embodiments of the disclosure provide a method for configuring multiple carriers, implemented by a terminal device. Referring to FIG. 7, the method includes the following operation.

In S101, the terminal device sends first information and/or second information to a network device.

The first information is configured to indicate a radio frequency architecture capability of the terminal device. The second information is configured to indicate a radio frequency link capability of the terminal device.

In the embodiment of the disclosure, the terminal device sends the first information and/or second information to report the radio frequency architecture capability and/or radio frequency link capability of the terminal device to the network device, and then the network device may configure suitable carriers for the terminal device based on the radio frequency architecture capability and/or radio frequency link capability of the terminal device.

Correspondingly, the embodiments of the disclosure also provide a method for configuring multiple carriers, implemented by a network device. Referring to FIG. 8, the method includes the following operations.

In S201, the network device receives first information and/or second information from a terminal device, the first information being configured to indicate a radio frequency architecture capability of the terminal device, and the second information being configured to indicate a radio frequency link capability of the terminal device.

In S202, the network device configures multiple carriers for the terminal device based on the first information and/or the second information.

In the embodiment of the disclosure, the network device receives the first information and/or the second information from the terminal device to know about the radio frequency architecture capability and/or radio frequency link capability of the terminal device to the network device, and thus may configure suitable carriers for the terminal device based on the radio frequency architecture capability and/or radio frequency link capability of the terminal device.

The embodiments of the disclosure may be implemented by various implementation modes, which will be described below respectively in detail.

Implementation Mode 1

In this implementation mode, a terminal device sends the first information to a network device, the first information being configured to indicate a radio frequency architecture capability of the terminal device, such that the network device may configure suitable carriers for the terminal device based on the radio frequency architecture capability of the terminal device.

The embodiment of the disclosure provides the following exemplary implementation modes.

Example 1: the radio frequency architecture capability of the terminal device may correspond to a type of a radio frequency architecture of the terminal device, and the type of the radio frequency architecture may include a transmitting link and receiving link shared LO architecture or a transmitting link and receiving link separated LO architecture.

Correspondingly, the operation that the network device configures multiple carriers for the terminal device based on the first information may include the following operations.

When the first information indicates that the radio frequency architecture of the terminal device is the transmitting link and receiving link shared LO architecture, the network device configures, for the terminal device, multiple carriers sharing a center frequency point.

When the first information indicates that the radio frequency architecture of the terminal device is the transmitting link and receiving link separated LO architecture, the network device configures, for the terminal device, multiple carriers not sharing a center frequency point.

In practical applications, the type of the radio frequency architecture of the terminal device may be indicated to the network device through 1 bit. Exemplarily, the first information may include a first bit (i.e., the 1 bit). The first bit is set to a first value to represent that the type of the radio frequency architecture is the transmitting link and receiving link shared LO architecture. The first bit is set to a second value to represent that the type of the radio frequency architecture is the transmitting link and receiving link separated LO architecture.

For example, the first value is 0, and the second value is 1. Alternatively, the first value is 1, and the second value is 0.

Example 2: the radio frequency architecture capability of the terminal device may correspond to a carrier addition mode supported by the terminal device, and the carrier addition mode may include bilaterally symmetric carrier addition or non-bilaterally-symmetric carrier addition.

Figure 9:
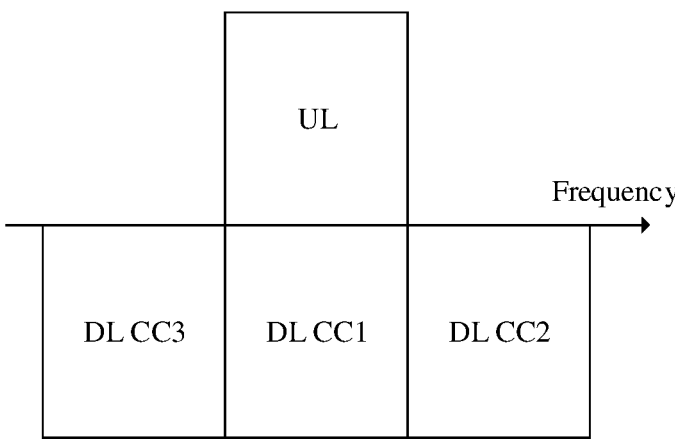
FIG. 9 is a schematic effect diagram of bilaterally symmetric carrier addition according to an embodiment of the disclosure.

FIG. 9 is a schematic effect diagram of bilaterally symmetric carrier addition according to an embodiment of the disclosure.

As shown in FIG. 9, the terminal device accesses a cell through DL component carrier 1 (CC1) which is a single carrier, and the network device may add symmetric carriers DL CC2 and DL CC3 at two sides of DL CC1 respectively.

Figure 10:
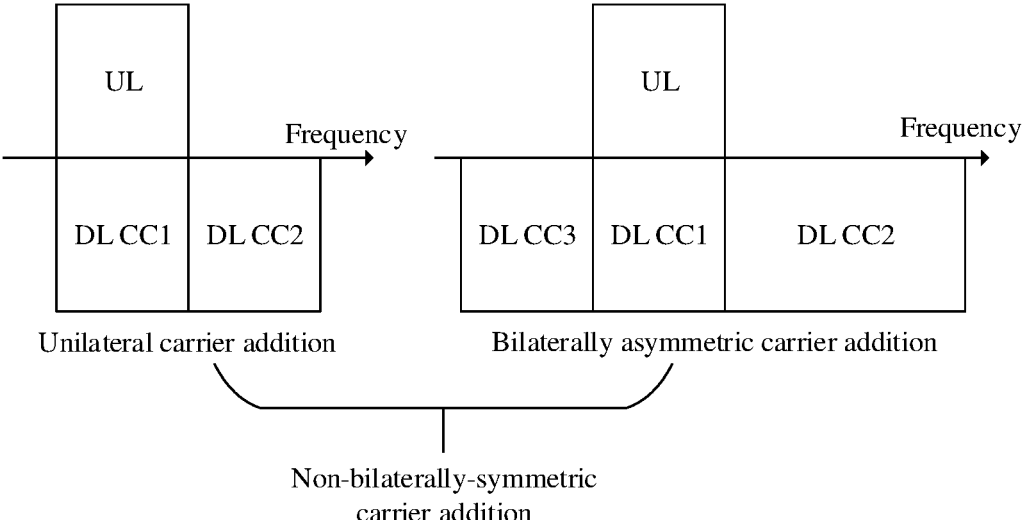
FIG. 10 is a schematic effect diagram of non-bilaterally-symmetric carrier addition according to an embodiment of the disclosure.

FIG. 10 is a schematic diagram of non-bilaterally-symmetric carrier addition according to an embodiment of the disclosure.

Optionally, non-bilaterally-symmetric carrier addition may include unilateral carrier addition and bilaterally asymmetric carrier addition. As shown in FIG. 10, the terminal device accesses a cell through DL CC1 which is a single carrier, and the network device may add carriers at one side of DL CC1, or add asymmetric carriers at two sides of DL CC1.

Correspondingly, the operation that the network device configures multiple carriers for the terminal device based on the first information may include the following operations.

When the first information indicates that the terminal device supports the bilaterally symmetric carrier addition mode, the network device configures, for the terminal device, multiple carriers sharing a center frequency point.

When the first information indicates that the terminal device supports non-bilaterally-symmetric carrier addition, the network device configures, for the terminal device, multiple carriers not sharing a center frequency point.

In practical applications, the carrier addition mode supported by the terminal device may be indicated to the network device through 1 bit. Exemplarily, the first information includes a second bit (i.e., the 1 bit). The second bit is set to a first value to represent that the terminal device supports the bilaterally symmetric carrier addition mode. The second bit is set to a second value to represent that the terminal device supports the non-bilaterally asymmetric carrier addition mode.

For example, the first value is 0, and the second value is 1. Alternatively, the first value is 1, and the second value is 0.

It is to be understood that each of the "first bit" and "second bit" mentioned in the above embodiment is 1 bit, and in practical applications, only one or both of them may be reported. In other words, the terminal device may report the radio frequency architecture to notify the base station of a supported carrier configuration mode, or may notify the carrier configuration mode by direct indication.

In practical applications, when the terminal device supports the bilaterally symmetric carrier addition mode, the type of the radio frequency architecture of the terminal device is the transmitting link and receiving link shared LO architecture. When the terminal device supports the non-bilaterally-symmetric carrier addition mode, the type of the radio frequency architecture of the terminal device is the transmitting link and receiving link separated LO architecture.

Exemplarily, the first information may be contained in Radio Resource Control (RRC) to report the radio frequency architecture capability per band, or report the radio frequency architecture capability per band combination, or report one radio frequency architecture capability for multiple bands.

For example, when the terminal device accesses the network device for the first time, in RRC signaling, the radio frequency architecture capability may be reported per band, or the radio frequency architecture capability may be reported per band combination, or one radio frequency architecture capability suitable for multiple bands may be reported for the multiple bands.

In this implementation mode, the terminal device may report the radio frequency architecture capability of the terminal device to the network device through the first information, such that the network device may configure suitable carriers for the terminal device based on the radio frequency architecture capability of the terminal device.

Implementation Mode 2

In this implementation mode, a terminal device sends second information to a network device, the second information being configured to indicate a radio frequency link capability of the terminal device, such that the network device may configure suitable carriers for the terminal device according to the radio frequency link capability of the terminal device.

In the embodiment of the disclosure, the radio frequency link capability of the terminal device includes a bandwidth capability supported by the terminal device.

Figure 11:
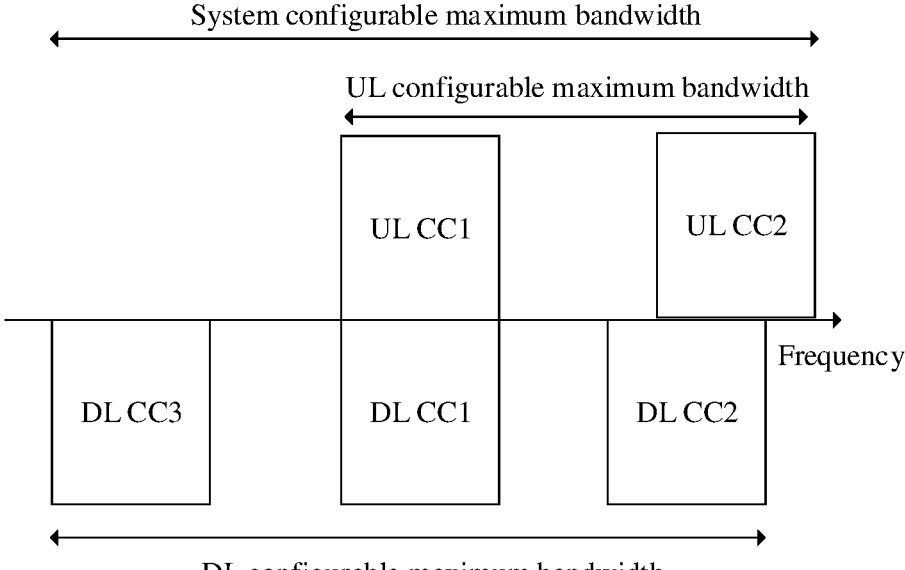
FIG. 11 is a schematic diagram of limits of configurable UL and DL maximum bandwidths of a terminal device according to an embodiment of the disclosure.

For example, actual capabilities of a transmitting link and a receiving link of the terminal device are different. FIG. 11 is a schematic diagram of limits of configurable UL and DL maximum bandwidths of a terminal device according to an embodiment of the disclosure, or may be regarded as a schematic diagram of bandwidths supported by a transmitting link and receiving link of a terminal device. Supported maximum UL and DL bandwidths are different, and a UL spectrum is not always within a DL spectrum. In order to describe a multi-carrier spectrum range supported by a radio frequency link of the terminal device comprehensively, the terminal device needs to report "system configurable maximum bandwidth", "UL configurable maximum bandwidth", and "DL configurable maximum bandwidth" capability information supported by the terminal device to a network. The network may learn bandwidth limits of the transmitting and receiving links of the terminal device, thereby keeping a configured bandwidth within a range acceptable for the terminal device.

Optionally, in some cases, the terminal device may report the above three types of capability information in a simplified manner. The below lists several cases where simplified reporting is allowed.

A: in case that a UL bandwidth capability of the terminal device is always within a DL bandwidth spectrum range, reporting of the terminal device may be simplified as follows.

a) Only the "UL configurable maximum bandwidth" and "DL configurable maximum bandwidth" capability information is reported.

b) Alternatively, only the "UL configurable maximum bandwidth" and "system configurable maximum bandwidth" capability information is reported.

B: in case that a DL bandwidth capability of the terminal device is always within a UL bandwidth spectrum range, reporting of the terminal device may be simplified as follows.

a) Only the "UL configurable maximum bandwidth" and "DL configurable maximum bandwidth" capability information is reported.

b) Alternatively, only the "system configurable maximum bandwidth" and "DL configurable maximum bandwidth" capability information is reported.

The network, when receiving the two bandwidth capabilities reported by the terminal, may determine by default that the UL and DL bandwidth capabilities of the terminal device are in a corresponding inclusion relationship, such as the inclusion relationship described in case A or case B.

Based on the above principle, exemplarily, the second information in the embodiment of the disclosure may include system configurable maximum bandwidth capability information, UL configurable maximum bandwidth capability information, and DL configurable maximum bandwidth capability information.

In practical applications, the relationship between the UL bandwidth capability and the DL bandwidth capability of the terminal device may be one of the followings.

There is no inclusion relationship between a UL bandwidth spectrum and a DL bandwidth spectrum of the terminal device.

The UL bandwidth capability of the terminal device is within the DL bandwidth spectrum range.

The DL bandwidth capability of the terminal device is within the UL bandwidth spectrum range.

Exemplarily, referring to FIG. 11, when there is no inclusion relationship between the UL bandwidth spectrum and the DL bandwidth spectrum of the terminal device, the second information may include UL configurable maximum bandwidth capability information, DL configurable maximum bandwidth capability information, and system configurable maximum bandwidth capability information.

When the UL bandwidth capability of the terminal device is within the DL bandwidth spectrum range, or the DL bandwidth capability of the terminal device is within the UL bandwidth spectrum range, the content of the second information may be simplified.

For example, when the UL bandwidth capability of the terminal device is within the DL bandwidth spectrum range, the second information includes UL configurable maximum bandwidth capability information and DL configurable maximum bandwidth capability information, or the second information includes UL configurable maximum bandwidth capability information and system configurable maximum bandwidth capability information.

For another example, when the DL bandwidth capability of the terminal device is within the UL bandwidth spectrum range, the second information includes UL configurable maximum bandwidth capability information and DL configurable maximum bandwidth capability information, or the second information includes system configurable maximum bandwidth capability information and DL configurable maximum bandwidth capability information.

Correspondingly, the operation that the network device configures multiple carriers for the terminal device based on the second information may include the following operations.

The network device configures a multi-carrier bandwidth for the terminal device based on a bandwidth capability of a radio frequency link of the terminal device indicated by the second information.

Optionally, when there is reported the second information only, the network device may determine by default that the capability corresponding to the first information is not limited. Therefore, the network device may configure, for the terminal device, multiple carriers sharing a center frequency point, or multiple carriers not sharing a center frequency point.

Optionally, when there is reported the first information only, the network device may determine by default that the capability corresponding to the second information is not limited, and may configure multiple carriers for the terminal device.

Optionally, the second information may be reported per band. Optionally, the second information may be reported per band combination. Optionally, the second information may also be reported per band group.

For example, multiple band combinations with close frequency ranges, such as bands n257, n258, and n261 within a spectrum range of 24 GHz to 29 GHz, may be considered as a band group.

It is to be understood here that reporting per band group and reporting per band combination are different reporting modes. For example, multiple bands {band A, band B, band C} that are unassociated with each other may be referred to as a band group. A band combination includes mutually associated bands, for example, for bands A+B and bands A+C, a group of band A and band B and a group of band A and band C are mutually associated and constitute a band combination. In the embodiment of the disclosure, the second information may be reported per band group, or reported per band combination, or reported per band, thereby reporting the bandwidth capability to the network device.

In this implementation mode, the terminal device reports the radio frequency link capability of the terminal device to the network device through the second information, such that the network device may configure suitable carriers for the terminal device according to the radio frequency link capability of the terminal device.

Implementation Mode 3

Based on the above-mentioned implementation mode 1 and implementation mode 2, the disclosure provides a third implementation mode. Specifically, a terminal device sends first information and second information to a network device so as to report its own radio frequency architecture capability and radio frequency link capability to the network device. The network device may configure multiple carriers for the terminal device based on the received first information and the second information.

In some embodiments of the disclosure, when the first information indicates that a radio frequency architecture of the terminal device is a transmitting link and receiving link shared LO architecture, the network device configures, for the terminal device, multiple carriers sharing a center frequency point.

When the first information indicates that the radio frequency architecture of the terminal device is a transmitting link and receiving link separated LO architecture, the network device configures, for the terminal device, multiple carriers not sharing a center frequency point.

The network device configures a multi-carrier bandwidth for the terminal device according to a bandwidth capability of a radio frequency link of the terminal device indicated by the second information.

In some other embodiments of the disclosure, when the first information indicates that the terminal device supports a bilaterally symmetric carrier addition mode, the network device configures, for the terminal device, multiple carriers sharing a center frequency point.

When the first information indicates that the terminal device supports non-bilaterally-symmetric carrier addition, the network device configures, for the terminal device, multiple carriers not sharing a center frequency point.

The network device configures a multi-carrier bandwidth for the terminal device according to a bandwidth capability of a radio frequency link of the terminal device indicated by the second information.

A process and manner that the terminal device reports the first information and the second information may refer to the contents described in the above-mentioned implementation modes 1 and 2, which may be applied to this implementation mode to achieve similar effects. Related contents will not be elaborated herein.

Specific settings and implementation modes of the embodiments of the disclosure are described above from different angles with multiple embodiments. According to the embodiments of the disclosure, a radio frequency architecture of a terminal is reported or whether only a bilaterally symmetric carrier addition mode is supported is reported, such that a base station may know about limits of the radio frequency architecture of the terminal and then consider a mode supported by the radio frequency architecture during multi-carrier configuration. In addition, UL and DL configurable maximum bandwidth capabilities of the terminal are reported, and then the base station may learn bandwidth limits of transmitting and receiving links of the terminal device, thereby keeping a configured bandwidth within a range acceptable for the terminal. Moreover, the two groups of capabilities may be both reported to a network, or independently reported to the network. When only one group of capabilities are reported, the network may determine by default that the other group of capabilities are not limited.

By at least one of the above-mentioned embodiments, a terminal device sends first information and/or second information to report a radio frequency architecture capability and/or radio frequency link capability of the terminal device to a network device, and then the network device may configure suitable carriers for the terminal device based on the radio frequency architecture capability and/or radio frequency link capability of the terminal device.

Figure 12:
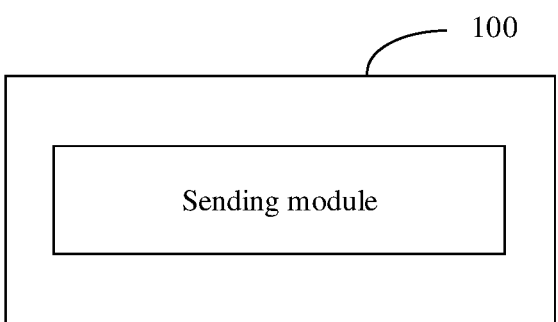
FIG. 12 is a schematic structure block diagram of a terminal device according to an embodiment of the disclosure.

Corresponding to the processing method of at least one of the above-mentioned embodiments, the embodiments of the disclosure also provide a terminal device 100, which, referring to FIG. 12, includes a sending module 110.

The sending module 110 is configured to send first information and/or second information to a network device.

The first information is configured to indicate a radio frequency architecture capability of the terminal device. The second information is configured to indicate a radio frequency link capability of the terminal device.

Optionally, the radio frequency architecture capability of the terminal device may correspond to a type of a radio frequency architecture of the terminal device.

The type of the radio frequency architecture may include a transmitting link and receiving link shared LO architecture or a transmitting link and receiving link separated LO architecture.

Optionally, the radio frequency architecture capability of the terminal device may correspond to a carrier addition mode supported by the terminal device.

The carrier addition mode may include bilaterally symmetric carrier addition or non-bilaterally-symmetric carrier addition.

Optionally, when the terminal device supports the bilaterally symmetric carrier addition mode, the type of the radio frequency architecture of the terminal device is the transmitting link and receiving link shared LO architecture.

When the terminal device supports the non-bilaterally-symmetric carrier addition mode, the type of the radio frequency architecture of the terminal device is the transmitting link and receiving link separated LO architecture.

Optionally, the first information may be contained in RRC to report the radio frequency architecture capability per band, or report the radio frequency architecture capability per band combination, or report one radio frequency architecture capability for multiple bands.

Optionally, the radio frequency link capability of the terminal device may include a bandwidth capability supported by the terminal device.

Optionally, the second information may include system configurable maximum bandwidth capability information, UL configurable maximum bandwidth capability information, and DL configurable maximum bandwidth capability information.

Optionally, when a UL bandwidth capability of the terminal device is within a DL bandwidth spectrum range, the second information includes UL configurable maximum bandwidth capability information and DL configurable maximum bandwidth capability, or the second information includes UL configurable maximum bandwidth capability information and system configurable maximum bandwidth capability information.

Optionally, when a DL bandwidth capability of the terminal device is within a UL bandwidth spectrum range, the second information includes UL configurable maximum bandwidth capability information and DL configurable maximum bandwidth capability information, or the second information includes system configurable maximum bandwidth capability information and DL configurable maximum bandwidth capability information.

Optionally, the second information may be reported per band, or, the second information is reported per band combination, or, the second information is reported per band group.

Figure 13:
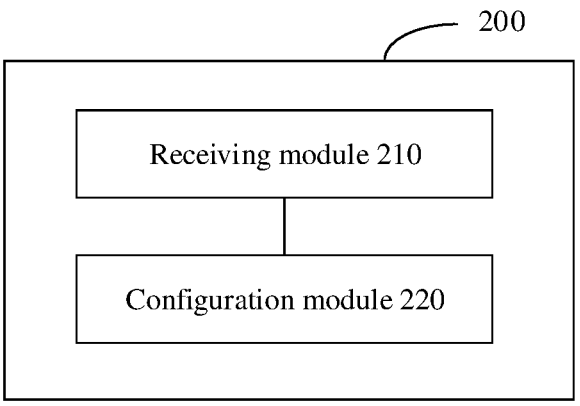
FIG. 13 is a schematic structure block diagram of a network device according to an embodiment of the disclosure.

Corresponding to the processing method of at least one of the above-mentioned embodiments, the embodiments of the disclosure also provide a network device 200, which, referring to FIG. 13, includes a receiving module 210 and a configuration module 220.

The receiving module 210 is configured to receive first information and/or second information from a terminal device, the first information being configured to indicate a radio frequency architecture capability of the terminal device, and the second information being configured to indicate a radio frequency link capability of the terminal device.

The configuration module 220 is configured to configure multiple carriers for the terminal device based on the first information and/or the second information.

Optionally, the radio frequency architecture capability of the terminal device may correspond to a type of a radio frequency architecture of the terminal device, and the type of the radio frequency architecture may include a transmitting link and receiving link shared LO architecture or a transmitting link and receiving link separated LO architecture.

The configuration module 220 may include a first configuration unit and a second configuration unit.

The first configuration unit is configured to, when the first information indicates that the radio frequency architecture of the terminal device is the transmitting link and receiving link shared LO architecture, configure, for the terminal device, multiple carriers sharing a center frequency point.

The second configuration module is configured to, when the first information indicates that the radio frequency architecture of the terminal device is the transmitting link and receiving link separated LO architecture, configure, for the terminal device, multiple carriers not sharing a center frequency point.

Optionally, the radio frequency architecture capability of the terminal device may correspond to a carrier addition mode supported by the terminal device, and the carrier addition mode may include bilaterally symmetric carrier addition or non-bilaterally-symmetric carrier addition.

The configuration module 220 may include a third configuration unit and a fourth configuration unit.

The third configuration unit is configured to, when the first information indicates that the terminal device supports the non-bilaterally-symmetric carrier addition mode, configure, for the terminal device, multiple carriers not sharing a center frequency point.

The fourth configuration unit is configured to, when the first information indicates that the terminal device supports the non-bilaterally-symmetric carrier addition mode, configure, for the terminal device, multiple carriers not sharing a center frequency point.

Optionally, the radio frequency link capability of the terminal device may include a bandwidth capability supported by the terminal device.

Optionally, the second information may include system configurable maximum bandwidth capability information, UL configurable maximum bandwidth capability information, and DL configurable maximum bandwidth capability information.

Optionally, when a UL bandwidth capability of the terminal device is within a DL bandwidth spectrum range, the second information includes UL configurable maximum bandwidth capability information and DL configurable maximum bandwidth capability, or the second information includes UL configurable maximum bandwidth capability information and system configurable maximum bandwidth capability information.

Optionally, when a DL bandwidth capability of the terminal device is within a UL bandwidth spectrum range, the second information includes UL configurable maximum bandwidth capability information and DL configurable maximum bandwidth capability information, or the second information includes system configurable maximum bandwidth capability information and DL configurable maximum bandwidth capability information.

Optionally, the configuration module 220 may include a fifth configuration unit and a sixth configuration unit.

The fifth configuration unit is configured to configure a multi-carrier bandwidth for the terminal device according to a bandwidth capability of a radio frequency link of the terminal device indicated by the second information.

The sixth configuration unit is configured to configure, for the terminal device, multiple carriers sharing a center frequency point or multiple carriers not sharing a center frequency point.

Optionally, the configuration module 220 may include a seventh configuration unit, an eighth configuration unit, and a ninth configuration unit.

The seventh configuration unit is configured to, when the first information indicates that the radio frequency architecture of the terminal device is the transmitting link and receiving link shared LO architecture, configure, for the terminal device, multiple carriers sharing a center frequency point.

The eighth configuration module is configured to, when the first information indicates that the radio frequency architecture of the terminal device is the transmitting link and receiving link separated LO architecture, configure, for the terminal device, multiple carriers not sharing a center frequency point.

The ninth configuration unit is configured to configure a multi-carrier bandwidth for the terminal device according to a bandwidth capability of a radio frequency link of the terminal device indicated by the second information.

Optionally, the configuration module 220 may include a tenth configuration unit, an eleventh configuration unit, and a twelfth configuration unit.

The tenth configuration unit is configured to, when the first information indicates that the terminal device supports the non-bilaterally-symmetric carrier addition mode, configure, for the terminal device, multiple carriers not sharing a center frequency point.

The eleventh configuration unit is configured to, when the first information indicates that the terminal device supports the non-bilaterally-symmetric carrier addition mode, configure, for the terminal device, multiple carriers not sharing a center frequency point.

The twelfth configuration unit is configured to configure a multi-carrier bandwidth for the terminal device based on a bandwidth capability of a radio frequency link of the terminal device indicated by the second information.

The terminal device 100 and network device 200 of the embodiments of the disclosure may realize the corresponding functions of the terminal device in the method embodiments. The flow, function, implementation mode, and beneficial effect corresponding to each module (submodule, unit, component, or the like) in the terminal device 100 and the network device 200 may refer to the corresponding descriptions in the method embodiments, and will not be elaborated herein.

It is to be noted that the function described with respect to each module (submodule, unit, component, or the like) in the terminal device 100 and network device 200 of the embodiments of the disclosure may be realized by different modules (submodules, units, components, or the like), or by the same module (submodule, unit, component or the like). For example, the first configuration unit and the second configuration unit may be different modules or the same module, and in both cases, the corresponding function of the terminal device in the embodiments of the disclosure may be realized.

Figure 14:
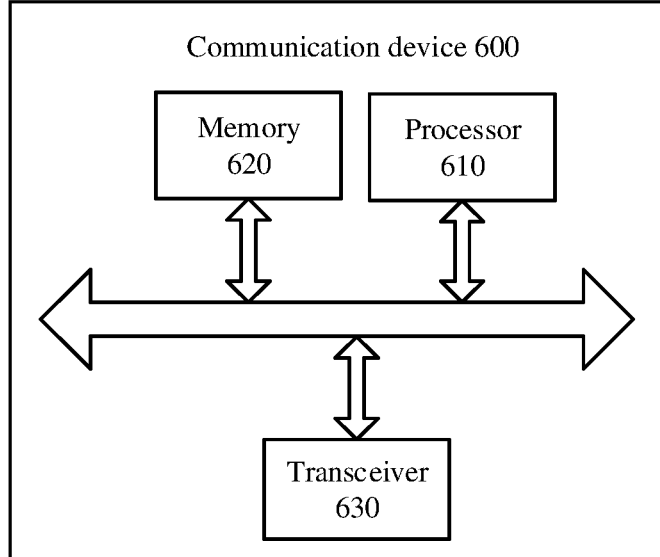
FIG. 14 is a schematic block diagram of a communication device according to an embodiment of the disclosure.

FIG. 14 is a schematic structure diagram of a communication device 600 according to an embodiment of the disclosure. The communication device 600 includes a processor 610. The processor 610 may call, from a memory, and run a computer program to implement the method in the embodiments of the disclosure.

Optionally, the communication device 600 may further include a memory 620. The processor 610 may call, from the memory 620, and run a computer program to implement the method in the embodiments of the disclosure.

The memory 620 may be an independent device independent of the processor 610, or may be integrated into the processor 610.

Optionally, the communication device 600 may further include a transceiver 630. The processor 610 may control the transceiver 630 to communicate with another device, specifically sending information or data to the other device or receiving information or data from the other device.

The transceiver 630 may include a transmitter and a receiver. The transceiver 630 may further include antennae. The number of the antennae may be one or more.

Optionally, the communication device 600 may be the network device of the embodiments of the disclosure. The communication device 600 may implement corresponding flows implemented by the network device in each method of the embodiments of the disclosure. For brevity, elaborations are omitted herein.

Optionally, the communication device 600 may be the terminal device of the embodiments of the disclosure. The communication device 600 may implement corresponding flows implemented by the terminal device in each method of the embodiments of the disclosure. For brevity, elaborations are omitted herein.

Figure 15:
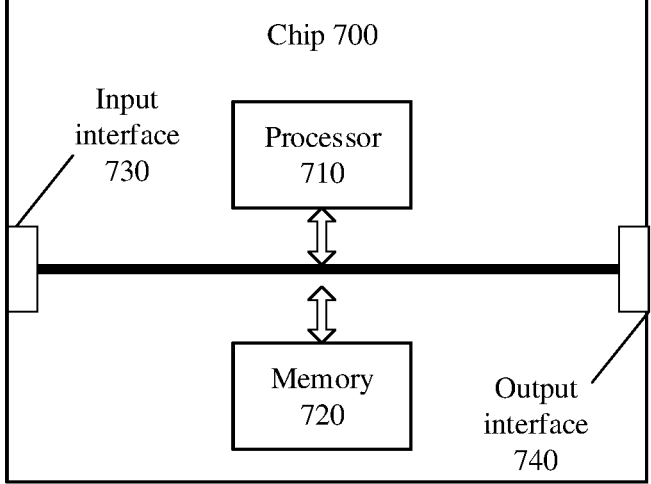
FIG. 15 is a schematic block diagram of a chip according to an embodiment of the disclosure.

FIG. 15 is a schematic structure diagram of a chip 700 according to an embodiment of the disclosure. The chip 700 includes a processor 710. The processor 710 may call, from a memory, and run a computer program to implement the method in the embodiments of the disclosure.

Optionally, the chip 700 may further include a memory 720. The processor 710 may call, from the memory 720, and run a computer program to implement the method in the embodiments of the disclosure.

The memory 720 may be an independent device independent of the processor 710, or may be integrated into the processor 710.

Optionally, the chip 700 may further include an input interface 730. The processor 710 may control the input interface 730 to communicate with another device or chip, specifically acquiring information or data from the other device or chip.

Optionally, the chip 700 may further include an output interface 740. The processor 710 may control the output interface 740 to communicate with another device or chip, specifically sending information or data to the other device or chip.

Optionally, the chip may be applied to the network device of the embodiments of the disclosure. The chip may implement corresponding flows implemented by the network device in each method of the embodiments of the disclosure. For brevity, elaborations are omitted herein.

Optionally, the chip may be applied to the terminal device in the embodiment shown in FIG. 12. The chip may implement corresponding flows implemented by the terminal device in each method of the embodiments of the disclosure. For brevity, elaborations are omitted herein.

It is to be understood that the chip mentioned in the embodiment of the disclosure may also be referred to as a system-level chip, a system chip, a chip system, a system on chip, or the like.

The processor mentioned above may be a general-purpose processor, a Digital Signal Processor (DSP), a Field Programmable Gate Array (FPGA), an Application Specific Integrated Circuit (ASIC), or another programmable logical device, transistor logical device, discrete hardware component, etc. The general-purpose processor mentioned above may be a microprocessor, or any conventional processor, etc.

The memory mentioned above may be a volatile memory or a nonvolatile memory, or may include both volatile and nonvolatile memories. The nonvolatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM).

It is to be understood that the memory is described as an example rather than restriction. For example, the memory in the embodiments of the disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), and a Direct Rambus RAM (DR RAM). That is, the memory in the embodiments of the disclosure is intended to include, but not limited to, memories of these and any other proper types.

Figure 16:
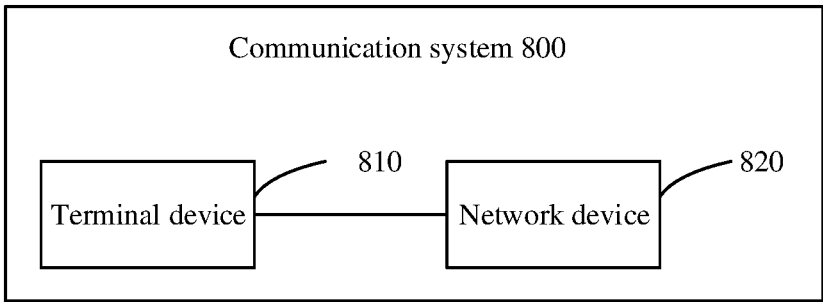
FIG. 16 is a schematic block diagram of a communication system according to an embodiment of the disclosure.

FIG. 16 is a schematic block diagram of a communication system 800 according to an embodiment of the disclosure. The communication system 800 includes a terminal device 810 and a network device 820.

The terminal device 810 may be configured to realize corresponding functions realized by the terminal device in the method of each embodiment of the disclosure. The network device 820 may be configured to realize corresponding functions realized by the network device in the method of each embodiment of the disclosure. For brevity, elaborations are omitted herein.

The embodiments may be implemented completely or partially by software, hardware, firmware, or any combination thereof. During implementation with software, the embodiments may be implemented completely or partially in form of a computer program product. The computer program product includes one or more computer instructions. When the computer program instruction is loaded and executed on a computer, the flows or functions described according to the embodiments of the disclosure are completely or partially generated. The computer may be a general-purpose computer, a special-purpose computer, a computer network, or another programmable device. The computer instruction may be stored in a computer-readable storage medium or transmitted from a computer-readable storage medium to another computer-readable storage medium. For example, the computer instruction may be transmitted from a website, computer, server, or data center to another website, computer, server, or data center in a wired (such as coaxial cable, optical fiber, and digital subscriber line (DSL)) or wireless (such as infrared, radio, and microwave) manner. The computer-readable storage medium may be any available medium accessible for the computer or a data storage device integrated with one or more available media, such as a server and a data center. The available medium may be a magnetic medium (such as a floppy disk, a hard disk, and a magnetic tape), an optical medium (such as a digital video disk (DVD)), a semiconductor medium (such as a solid state disk (SSD)), or the like.

It is to be understood that, in each embodiment of the disclosure, the magnitude of the sequence number of each process does not mean an execution sequence, and the execution sequence of each process should be determined by its function and an internal logic and should not form any limitation on the implementation of the embodiments of the disclosure.

Those skilled in the art may clearly know that specific working processes of the system, device, and unit as described above may refer to the corresponding processes in the method embodiment and will not be elaborated herein for ease and brevity of description.

The above is only the specific implementation mode of the disclosure and not intended to limit the scope of protection of the disclosure. Any variations or replacements apparent to those skilled in the art within the technical scope disclosed in the disclosure shall fall within the scope of protection of the disclosure. Therefore, the scope of protection of the disclosure shall be subject to the scope of protection of the claims.

The invention claimed is:

1. A method for configuring multiple carriers, implemented by a terminal device and comprising:

sending, by the terminal device, at least one of first information or second information to a network device, wherein the first information is configured to indicate a radio frequency architecture capability of the terminal device, and the second information is configured to indicate a radio frequency link capability of the terminal device, wherein the radio frequency architecture capability of the terminal device corresponds to a carrier addition mode supported by the terminal device, wherein the carrier addition mode comprises: bilaterally symmetric carrier addition or non-bilaterally-symmetric carrier addition, wherein when the terminal device supports the bilaterally symmetric carrier addition mode, a type of a radio frequency architecture of the terminal device is a transmitting link and receiving link shared local oscillator (LO) architecture; and when the terminal device supports the non-bilaterally-symmetric carrier addition mode, a type of a radio frequency architecture of the terminal device is a transmitting link and receiving link separated LO architecture, wherein the first information is contained in Radio Resource Control (RRC) to report the radio frequency architecture capability per band, or report the radio frequency architecture capability per band combination, or report one radio frequency architecture capability for multiple bands, wherein the first information comprises a second bit;

wherein the second bit is set to a first value to represent that the terminal device supports the bilaterally symmetric carrier addition mode; and the second bit is set to a second value to represent that the terminal device supports the non-bilaterally-symmetric carrier addition mode.

2. The method of claim 1, wherein the radio frequency link capability of the terminal device comprises a bandwidth capability supported by the terminal device.

3. The method of claim 2, wherein the second information comprises: system configurable maximum bandwidth capability information, uplink (UL) configurable maximum bandwidth capability information, and downlink (DL) configurable maximum bandwidth capability information.

4. The method of claim 2, wherein when a UL bandwidth capability of the terminal device is within a DL bandwidth spectrum range, the second information comprises UL configurable maximum bandwidth capability information and DL configurable maximum bandwidth capability information;

or, the second information comprises UL configurable maximum bandwidth capability information and system configurable maximum bandwidth capability information.

5. The method of claim 2, wherein when a DL bandwidth capability of the terminal device is within a UL bandwidth spectrum range, the second information comprises UL configurable maximum bandwidth capability information and DL configurable maximum bandwidth capability information;

or, the second information comprises system configurable maximum bandwidth capability information and DL configurable maximum bandwidth capability information.

6. The method of claim 2, wherein the second information is reported per band, or, the second information is reported per band combination, or, the second information is reported per band group.

7. A terminal device, comprising:

a processor; and a transceiver, connected to the processor and configured to send at least one of first information or second information to a network device, wherein the first information is configured to indicate a radio frequency architecture capability of the terminal device, and the second information is configured to indicate a radio frequency link capability of the terminal device, wherein the radio frequency architecture capability of the terminal device corresponds to a carrier addition mode supported by the terminal device, wherein the carrier addition mode comprises: bilaterally symmetric carrier addition or non-bilaterally-symmetric carrier addition, wherein when the terminal device supports the bilaterally symmetric carrier addition mode, a type of a radio frequency architecture of the terminal device is a transmitting link and receiving link shared local oscillator (LO) architecture; and when the terminal device supports the non-bilaterally-symmetric carrier addition mode, a type of a radio frequency architecture of the terminal device is a transmitting link and receiving link separated LO architecture, wherein the first information is contained in Radio Resource Control (RRC) to report the radio frequency architecture capability per band, or report the radio frequency architecture capability per band combination, or report one radio frequency architecture capability for multiple bands, wherein the first information comprises a second bit;

wherein the second bit is set to a first value to represent that the terminal device supports the bilaterally symmetric carrier addition mode; and the second bit is set to a second value to represent that the terminal device supports the non-bilaterally-symmetric carrier addition mode.

8. The terminal device of claim 7, wherein the radio frequency link capability of the terminal device comprises a bandwidth capability supported by the terminal device.

9. The terminal device of claim 8, wherein when a UL bandwidth capability of the terminal device is within a DL bandwidth spectrum range, the second information comprises UL configurable maximum bandwidth capability information and DL configurable maximum bandwidth capability information;

or, the second information comprises UL configurable maximum bandwidth capability information and system configurable maximum bandwidth capability information.

10. The terminal device of claim 8, wherein the second information is reported per band, or, the second information is reported per band combination, or, the second information is reported per band group.

11. A network device, comprising:

a transceiver, configured to receive at least one of first information or second information from a terminal device, the first information being configured to indicate a radio frequency architecture capability of the terminal device, and the second information being configured to indicate a radio frequency link capability of the terminal device; and a processor, connected to the transceiver and configured to configure multiple carriers for the terminal device based on at least one of the first information or the second information, wherein the radio frequency architecture capability of the terminal device corresponds to a carrier addition mode supported by the terminal device, wherein the carrier addition mode comprises: bilaterally symmetric carrier addition or non-bilaterally-symmetric carrier addition, wherein when the terminal device supports the bilaterally symmetric carrier addition mode, a type of a radio frequency architecture of the terminal device is a transmitting link and receiving link shared local oscillator (LO) architecture; and when the terminal device supports the non-bilaterally-symmetric carrier addition mode, a type of a radio frequency architecture of the terminal device is a transmitting link and receiving link separated LO architecture, wherein the first information is contained in Radio Resource Control (RRC) to report the radio frequency architecture capability per band, or report the radio frequency architecture capability per band combination, or report one radio frequency architecture capability for multiple bands, wherein the first information comprises a second bit;

wherein the second bit is set to a first value to represent that the terminal device supports the bilaterally symmetric carrier addition mode; and the second bit is set to a second value to represent that the terminal device supports the non-bilaterally-symmetric carrier addition mode.

12. The network device of claim 11, wherein
the radio frequency link capability of the terminal device
    comprises a bandwidth capability supported by the
    terminal device.

13. The network device of claim 12, wherein
when a UL bandwidth capability of the terminal device is
    within a DL bandwidth spectrum range,
    the second information comprises UL configurable
        maximum bandwidth capability information and DL
        configurable maximum bandwidth capability infor-
        mation;
    or,
    the second information comprises UL configurable
        maximum bandwidth capability information and sys-
        tem configurable maximum bandwidth capability
        information.

14. The network device of claim 12, wherein the second
information is received per band, or, the second information
is received per band combination, or, the second information
is received per band group.

* * * * *